United States Patent
Takahashi

(10) Patent No.: US 6,754,973 B2
(45) Date of Patent: Jun. 29, 2004

(54) PERIPHERAL SURFACE SHAPE MEASURING APPARATUS OF ROLL-LIKE OBJECT

(75) Inventor: Shinsuke Takahashi, Odawara (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/993,762

(22) Filed: Nov. 27, 2001

(65) Prior Publication Data

US 2002/0095808 A1 Jul. 25, 2002

(30) Foreign Application Priority Data

Nov. 30, 2000 (JP) .......................... 2000-365427

(51) Int. Cl.$^7$ .............................................. G01B 5/20
(52) U.S. Cl. ........................... 33/551; 33/555.1; 33/553
(58) Field of Search ...................... 33/551, 501.02, 33/501.03, 501.04, 549, 550, 552, 553, 554, 555, 555.1, 555.3, 558.01, 558.04, 558.3, 558.4

(56) References Cited

U.S. PATENT DOCUMENTS

| | | | | |
|---|---|---|---|---|
| 2,353,813 A | * | 7/1944 | Deeren | 73/104 |
| 2,609,609 A | * | 9/1952 | Moss | 33/549 |
| 3,169,323 A | * | 2/1965 | Hold | 33/501.6 |
| 3,427,723 A | * | 2/1969 | Leckey et al. | 33/554 |
| 4,389,788 A | * | 6/1983 | Balogh et al. | 33/555.1 |
| 4,807,400 A | * | 2/1989 | Corallo et al. | 451/8 |
| 5,086,569 A | * | 2/1992 | Possati et al. | 33/549 |
| 5,088,207 A | * | 2/1992 | Betsill et al. | 33/555.3 |
| 5,154,003 A | * | 10/1992 | Moore | 33/558.01 |
| 5,230,157 A | * | 7/1993 | Ota et al. | 33/550 |
| 5,337,485 A | * | 8/1994 | Chien | 33/550 |
| 5,551,906 A | * | 9/1996 | Helgren | 451/8 |
| 6,041,512 A | * | 3/2000 | Wacke | 33/522 |
| 6,427,353 B1 | * | 8/2002 | Nelson et al. | 33/552 |
| 6,463,669 B1 | * | 10/2002 | Rollier et al. | 33/549 |
| 6,568,096 B1 | * | 5/2003 | Svitkin et al. | 33/550 |
| 2002/0050069 A1 | * | 5/2002 | Mellander | 33/551 |

FOREIGN PATENT DOCUMENTS

JP         8-102064 B1      4/1996

* cited by examiner

Primary Examiner—Christopher W. Fulton
Assistant Examiner—Amy R Cohen
(74) Attorney, Agent, or Firm—Sughrue Mion, PLLC

(57) ABSTRACT

The peripheral surface shape measuring apparatus can simply and accurately measure a peripheral surface shape of a roll-like object. The peripheral surface shape of a roll-like object is measured by moving a displacement amount measuring device which pinches a diameter direction of the roll-like object with a sensor part and a reference point part arranged opposite to each other in the diameter direction of the roll-like object, from one end side to the other end side in an axial direction of the roll-like object by using a moving device.

4 Claims, 4 Drawing Sheets

PERIPHERAL SURFACE SHAPE MEASURING APPARATUS OF ROLL-LIKE OBJECT

BACKGROUND OF THE INVENTION

1. Field of the Invention

The present invention relates to a peripheral surface shape measuring apparatus of a roll-like object, and more particularly, relates to a peripheral surface shape measuring apparatus of a roll-like object which measures the peripheral surface shape of a huge roll-like object such as a magnetic tape bulk roll and judges whether or not the peripheral surface of the roll-like object is poorly shaped to have a curve or the like.

2. Description of the Related Art

Magnetic tape is made by cutting a wide magnetic tape bulk roll so that the bulk roll is separated into rolls with the same narrow width. However, in the roll forming of a magnetic tape bulk roll, the winding force at both end parts of the magnetic tape bulk roll is slightly different from that at the central part, and therefore, in some cases, such a bad quality of the peripheral surface shape where the roll peripheral surface has the central part swelling like a curve along the axial direction of the roll is caused. A magnetic tape obtained from a magnetic tape bulk roll with a large degree of this bad quality of the peripheral surface shape does not have a linear shape but has a curved shape. Therefore, the use of such magnetic tape causes the bad quality in electrical output or the like and lowers reliability as a product.

Accordingly, it is necessary that before cutting a magnetic tape bulk roll, the peripheral surface shape of the magnetic tape bulk roll is inspected to examine the degree of the curve, and that one which passes a specific standard is used.

As a conventional peripheral surface shape measuring apparatus of a roll-like object, there is one which is described in Japanese Patent Application Publication No. 8-102064.

As shown in FIGS. 7 and 8, this peripheral surface shape measuring apparatus of a roll-like object is an apparatus which measures the shape of a magnetic tape bulk roll 14, by measuring the displacement amount at the time when a shape sensor a rotates, while moving the contact type shape sensor a which is attached to the concave part of a measuring device and rotates according to the peripheral surface shape of the roll-like object, from one end side of the magnetic tape bulk roll 14 toward the other end side.

However, in the case of the conventional peripheral surface shape measuring apparatus of a roll-like object described in Japanese Patent Application Publication No. 8-102064, the displacement amount at the time when the shape sensor a rotates is measured with respect to the mounting position of the measuring device, and therefore, there is such a disadvantage that the measurement error becomes large unless the measuring device is provided so that the shape sensor a moves completely in parallel to the central axis of the roll-like object 14. For example, if the moving direction of the shape sensor a is inclined to the central axis of the roll-like object 14, the measurement is performed inflating the score by the degree corresponding to the inclination, and the measuring accuracy is lowered. Accordingly, in order to raise the measuring accuracy, the mounting accuracy of the measuring device to the roll-like object 14 should also be raised, but a delicate apparatus is necessary for that purpose, and therefore, not only does the apparatus become complicated but also a cost increase is caused.

SUMMARY OF THE INVENTION

The present invention has been achieved in view of the above-described circumstances, and has as its object the provision of an improved peripheral surface shape measuring apparatus of a roll-like object which can simply and accurately measure the peripheral surface shape of a roll-like object.

In order to attain the above described object, the present invention is directed to a peripheral surface shape measuring apparatus of a roll-like object which measures a peripheral surface shape of a roll-like object, comprising: a displacement amount measuring device which has a pinching device that pinches the roll-like object in a diameter direction of the roll-like object with a sensor part and a reference point part arranged opposite to each other, and which measures a displacement amount when the sensor part is relatively displaced in the diameter direction with respect to the reference point part; and a moving device which moves the displacement amount measuring device from one end side of the roll-like object to another end side of the roll-like object in an axial direction of the roll-like object, wherein the peripheral surface shape of the roll-like object is measured on the basis of the displacement amount of the sensor part accompanied by movement of the displacement amount measuring device.

According to the present invention, the peripheral surface shape of the roll-like object is measured by moving the displacement amount measuring device which pinches the roll-like object with the sensor part and the reference point part arranged opposite to each other in the diameter direction of the roll-like object from one end side in the axial direction of the roll-like object to the other end side by using the moving device, and therefore, even if the mounting accuracy of the peripheral surface shape measuring apparatus to the roll-like object is not so high, the peripheral surface shape of the roll-like object can simply and accurately be measured.

Preferably, contact positions to the roll peripheral surface of the sensor part and the reference point part which pinch the roll-like object are within a range of ±5 mm with respect to the diameter direction in a plane perpendicular to the diameter direction, and therefore, more accurate measurement is possible.

Preferably, the sensor part and the reference point part are shaped like bars which are perpendicular to an axial direction of the roll-like object and are in parallel to each other, and therefore, even if the contact points of the sensor part and the reference point part slightly deviate from the line in the diameter direction of the roll-like object, the diameter of the roll-like object can surely be measured.

Preferably, a guiding device is further provided to make it easy for the displacement amount measuring device to move in parallel to the central axis of the roll-like object, and therefore, more accurate measurement is possible.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Hereunder, a preferred embodiment will be described in detail for a structure of a peripheral surface shape measuring apparatus of a roll-like object according to preferred embodiments of the present invention in accordance with the accompanied drawings.

Figure 1:
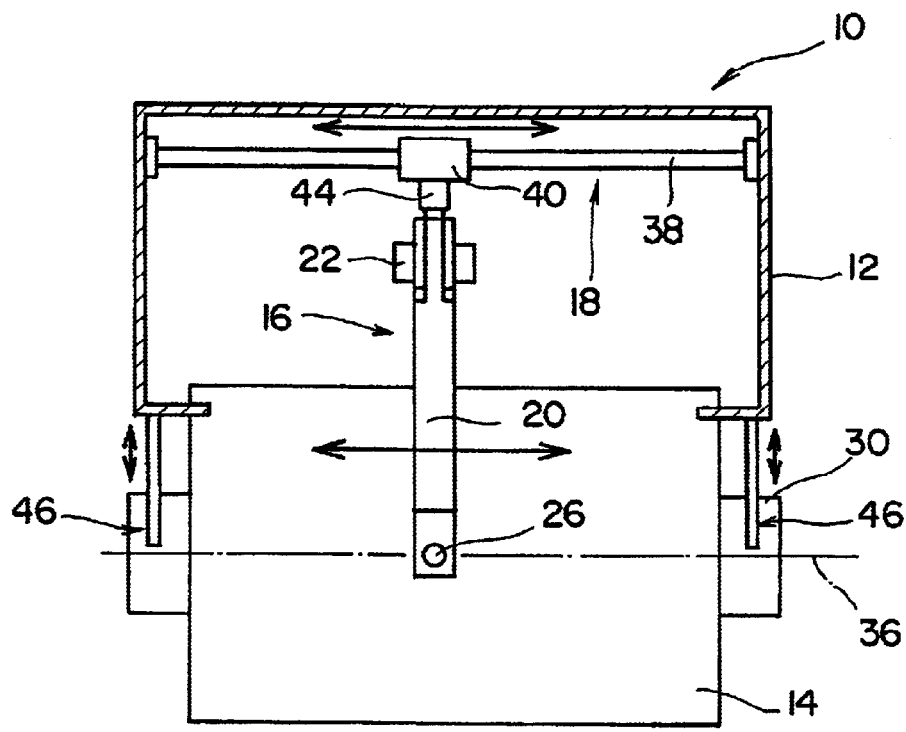
FIG. 1 is an explanation view which explains a total configuration of a peripheral surface shape measuring apparatus of a roll-like object of the present invention.
Figure 2:
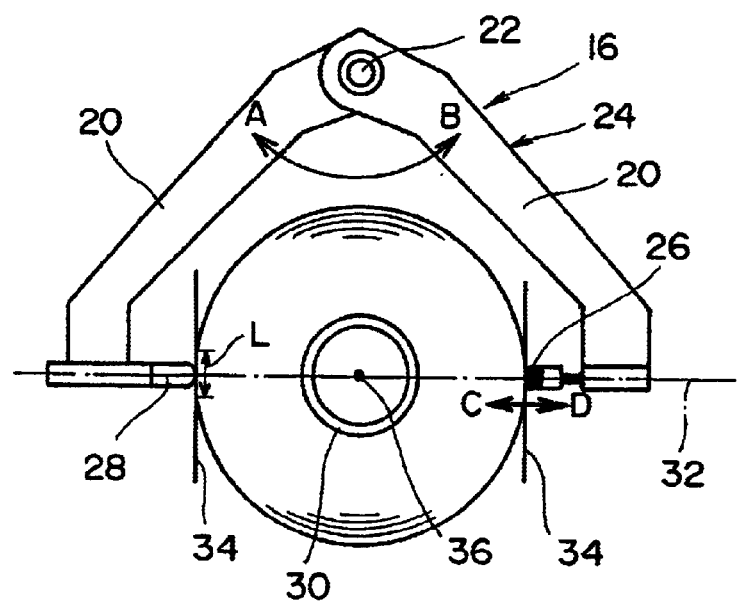
FIG. 2 is an explanation view which explains a displacement amount measuring device of the peripheral surface shape measuring apparatus of the roll-like object of the present invention.

FIG. 1 is an explanation view which explains a total configuration of a peripheral surface shape measuring apparatus of the roll-like object according to an embodiment of the present invention, and FIG. 2 is an explanation view which explains a displacement amount measuring device in the peripheral surface shape measuring apparatus.

As shown in FIG. 1, the peripheral surface shape measuring apparatus 10 is mainly constructed by providing a displacement amount measuring device 16 which measures the displacement amount in the diameter direction of a roll-like object 14 and a moving device 18 which moves the displacement amount measuring device 16 from one end side in the axial direction of the roll-like object 14 to the other end side, in a casing 12 whose bottom part is open, and at the time of measuring the peripheral surface shape of the roll-like object 14, the casing 12 is detachably attached to the roll-like object 14.

As shown in FIG. 2, the displacement amount measuring device 16 has a sensor part 26 and a reference point part 28 which are arranged opposite to each other, and attached to the tip parts of two arms 20, 20 of an approximately V-shaped pinching device 24 whose base end parts are connected with a hinge 22, respectively. The pinching device 24 can be opened and closed in an A-B direction of FIG. 2, and it pinches the roll-like object 14 with the sensor part 26 and the reference point part 28 in the diameter direction of the roll-like object 14. The roll-like object 14 is wound on a winding core 30. To the pinching device 24, a fixing member (not shown in the figure) which fixes the opening and closing of two arms 20, 20 is provided, and the opening and closing is fixed in a desired state. The sensor part 26 is constructed so as to be displaceable in a C-D direction (diameter direction) of the roll-like object 14, and a relative displacement amount of the sensor part 26 with respect to the reference point part 28 is measured. This displacement amount is expressed as a change of the diameter of the roll-like object 14. Accordingly, it is best that the contact points to the roll peripheral surface of the sensor part 26 and the reference point part 28 which pinch the roll-like object 14 are positioned on the line of the diameter direction line 32 of the roll-like object 14 in FIG. 2, but if any deviation (L) in the vertical direction with respect to the diameter direction line 32 is within the range of ±5 mm in the vertical planes 34 perpendicular to the diameter direction line 32, there is no problem. Furthermore, as a sensor part 26, for example, a differential transformer can be used.

Figure 3:
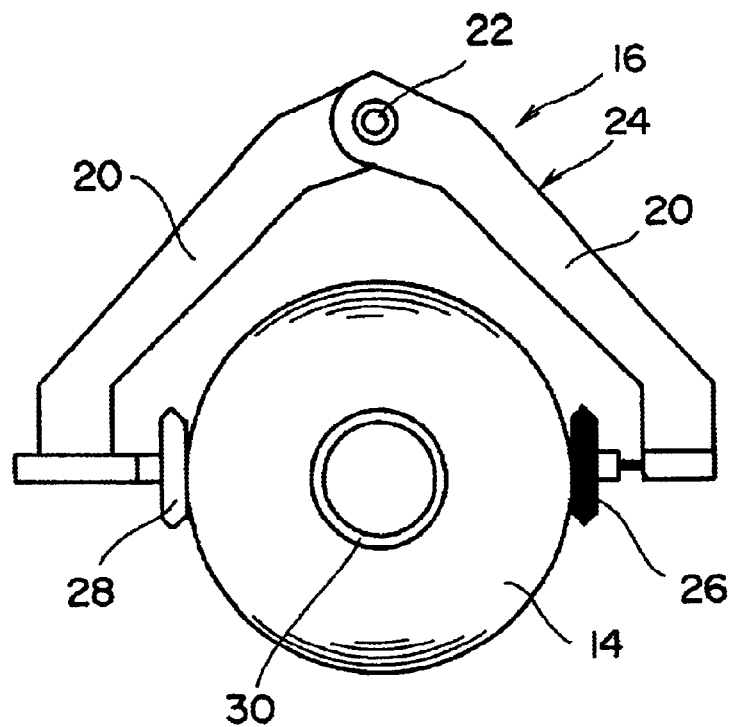
FIG. 3 is an explanation view which explains another aspect of shapes of a sensor part and a reference point part.

Furthermore, in FIG. 2, a sensor part 26 and a reference point part 28 which are formed to project to the peripheral surface of the roll-like object 14 are shown, but as shown in FIG. 3, it is more preferable that they are shaped like bars which are perpendicular to the central axis line 36 of the roll-like object 14 and are in parallel to each other. Consequently, even if the contact positions of the sensor part 26 and the reference point part 28 at the time when pinching the roll-like object 14 are a little shifted from the line of the diameter direction line 32, the diameter of the roll-like object 14 can surely be measured. Accordingly, when compared with the case in FIG. 2, it is unnecessary to pay much attention to the pinching position of the roll-like object 14. In this case, if the width of the bar-like sensor part 26 is too large, the contact is performed by a wide width in the axial direction of the roll-like object 14, and the measuring accuracy becomes worse, and therefore, the shape of a thin bar is better.

As a moving device 18, as shown in FIG. 1, for example, a so-called mono-rail system can be used, which includes a rail 38 arranged in parallel with the axial direction of the roll-like object 14 when the peripheral surface shape measuring apparatus 10 is mounted to the roll-like object 14, and a moving body 40 with a self-acting power to move on the rail 38. Then, to the moving body 40, a connector 44 which is attached to the base end part of the displacement amount measuring device 16 is connected. Consequently, the displacement amount measuring device 16 can move between one end side and the other end side of the roll-like object 14. Accordingly, the displacement amount of the sensor part 26 accompanied by the movement of the displacement amount measuring device 16 which is moved from one end side to the other end side in the axial direction of the roll-like object 14 by the moving device 18 is measured as a change amount of the diameter of each position in the axial direction of the roll-like object 14, and the change of the diameter expresses the peripheral surface shape as it is. Furthermore, as a moving device 18, the device is not limited to a mono-rail system, and any device can be used, if it can move the displacement amount measuring device 16 linearly and stably along the axial direction of the roll-like object 14.

Figure 4:
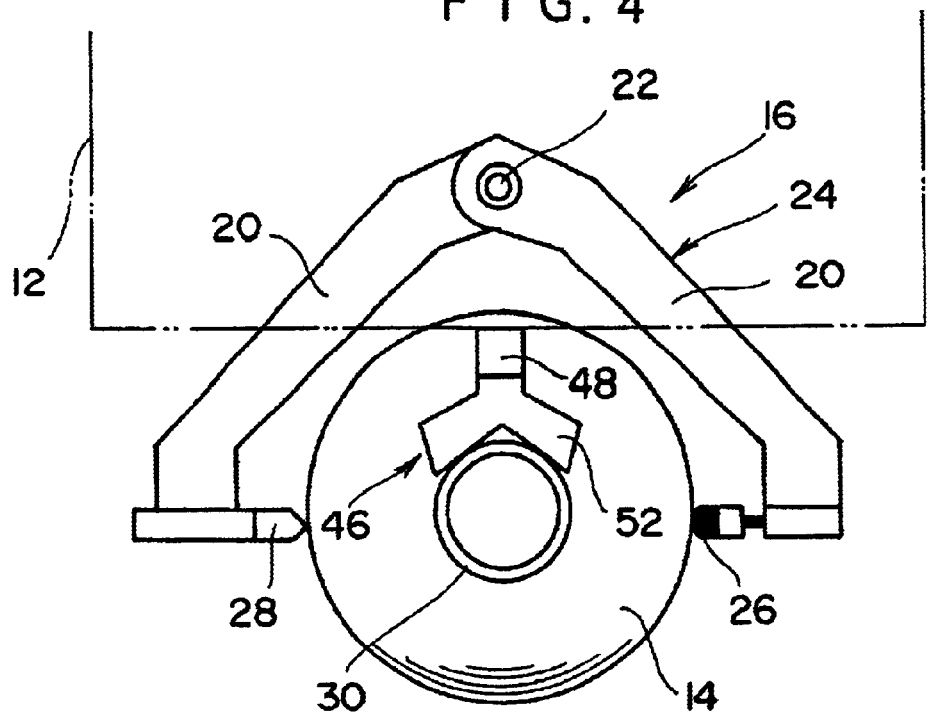
FIG. 4 is an explanation view which explains a guiding device of the peripheral surface shape measuring apparatus of the roll-like object of the present invention.
Figure 5:
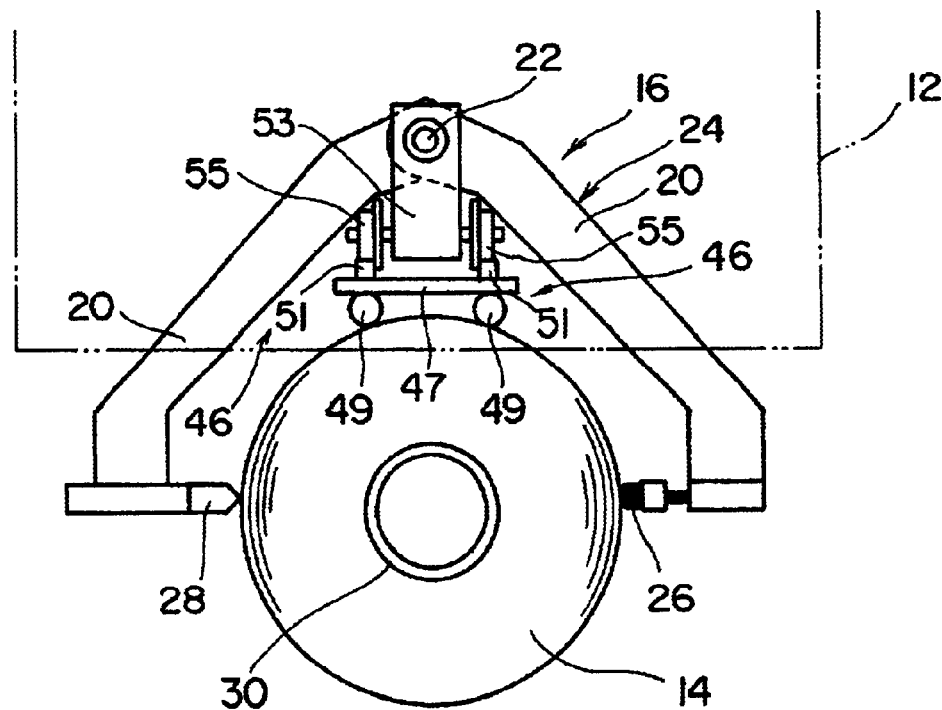
FIG. 5 is an explanation view which explains another guiding device.

FIGS. 4 and 5 are explanation views for explaining guiding devices 46 which make it easy for the displacement amount measuring device 16 to be moved in parallel to the central axis of the roll-like object 14.

The guiding device 46 in FIG. 4 is constructed by providing a forked supporting part 52 to a jacking device 48. Then, at the time of using the guiding device 46, the forked supporting parts 52 of a pair of guiding devices 46 are engaged and fastened on both sides of the winding core 30 of the roll-like object 14, and after that, by using a pair of jacking devices 48, the adjusting is performed so that the inclination of the casing 12 to the winding core 30 is eliminated. Consequently, the rail 38 becomes in parallel to the winding core 30, and therefore, the displacement amount measuring device 16 can be moved in parallel to the central axis line 36 of the roll-like object 14.

In the case of the guiding device 46 in FIG. 5, under (on the roll-like object side of) a plate 47 with a length from one end side to the other end side in the axial direction of the roll-like object 14, two round bars 49, 49 in parallel to the axial direction of the roll-like object 14 are provided.

Furthermore, on the plate 47, two rails 51, 51 in parallel to the axial direction of the roll-like object 14 are provided, and on this rail 51, a measuring vehicle 53 which supports the displacement amount measuring device 16 runs through wheels 55, 55. If this measuring vehicle 53 has a self-acting system, it is unnecessary to provide a special moving device 18. Furthermore, to the plate 47, a level (not shown in the figure) is provided. Then, in the case where the peripheral surface shape of the roll-like object 14 is measured by the displacement amount measuring device 16, a plate 47 is mounted through two round bars 49 on the peripheral surface of the roll-like object 14. At this moment, by using the level of the plate 47, the positioning is performed so that the plate 47 is horizontal. By this positioning, the middle point of the rails 51, 51 comes onto the axis of the roll-like object 14, and therefore, as a result, the running direction of the displacement amount measuring device 16, that is, the running direction of the sensor part 26 agrees with the axial direction of the roll-like object 14. In this state, by putting and running the measuring vehicle 53 on the rail 51, the peripheral surface shape of the roll-like object 14 is measured by the displacement amount measuring device 16.

Figure 6:
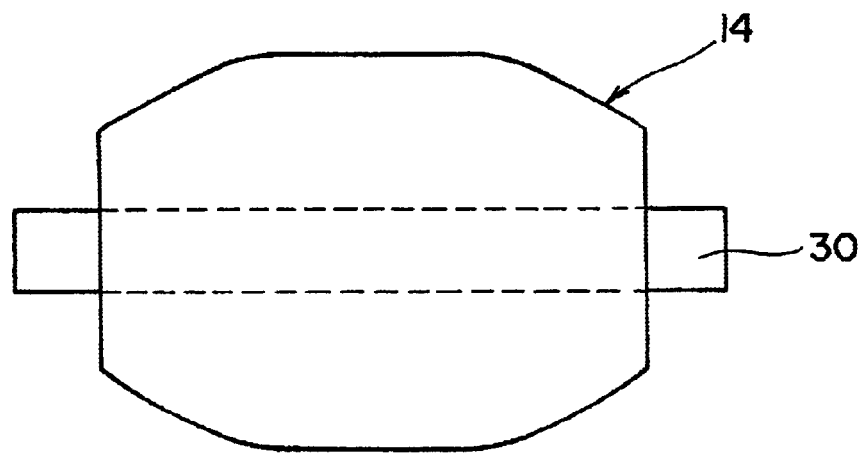
FIG. 6 is an explanation view which explains a curved peripheral surface shape of the roll-like object.

Next, a method will be described, by which the peripheral surface shape of a roll-like object 14 whose peripheral surface is curved as shown in FIG. 6 is measured by using a peripheral surface shape measuring apparatus 10 constructed as described above.

First, the diameter direction of the roll-like object 14 that is the object to be measured is pinched with the sensor part 26 and the reference point part 28 by using the pinching device 24, and in the meantime, adjustment is performed so that the inclination of the casing 12 to the winding core 30 is eliminated by using the guiding device 46. Then, in the state where the sensor part 26 is positioned at the middle position between the displacement lower limit position and the displacement upper limit position of the sensor part 26, that is, the zero point position, the opening and closing of the pinching device 24 is fixed.

Next, the moving device 18 is driven to move the displacement amount measuring device 16 from one end side of the roll-like object 14 to the other end side. Consequently, the peripheral surface shape of the roll-like object 14 can simply and accurately be measured.

The present invention gives attention to the fact that as is apparent from FIG. 6, the peripheral surface shape of the roll-like object 14 that is the object to be measured is symmetrical with respect to the central axis line 36 of the roll-like object 14, and in the case where it is symmetrical with respect to the central axis line 36 like this, the peripheral surface shape can be grasped as the change of the diameter of the roll-like object 14. That is, by moving the displacement amount measuring device 16 which pinches the roll-like object 14 with the sensor part 26 and the reference point part 28 arranged opposite to each other in the diameter direction of the roll-like object 14, in the axial direction of the roll-like object 14 by using the moving device 18, the displacement amount of the sensor part 26 accompanied by the movement, that is to say, the change of the diameter of the roll-like object 14 expresses the peripheral surface shape as it is. Accordingly, in the case of the present invention, the measurement is a relative measurement with respect to the reference point part 28 brought into contact with the roll-like object 14 itself that is the object to be measured, and therefore, even in the case where the moving direction of the displacement amount measuring device 16 is not completely in parallel to the central axis line 36 of the roll-like object 14, the effect given onto the measuring accuracy can be reduced.

Thus, the present invention is not a system which performs measurement with respect to the mounting position of the measuring device like the conventional system, and therefore, even if much attention is not given to the mounting accuracy of the displacement amount measuring device 16 to the roll-like object 14, the dispersion in the measuring accuracy can be restrained. Accordingly, simple and accurate measurement is possible.

EXAMPLE

Next, an example of the present invention will be described, in which the peripheral surface shape of a roll-like object was actually measured by using the peripheral surface shape measuring apparatus of a roll-like object according to the present invention.

As the peripheral surface shape measuring apparatus of the example of the present invention, an apparatus shown in FIG. 2 and having a sensor part and a reference point part was used, and in the meantime, the guiding device was not used.

Figure 7:
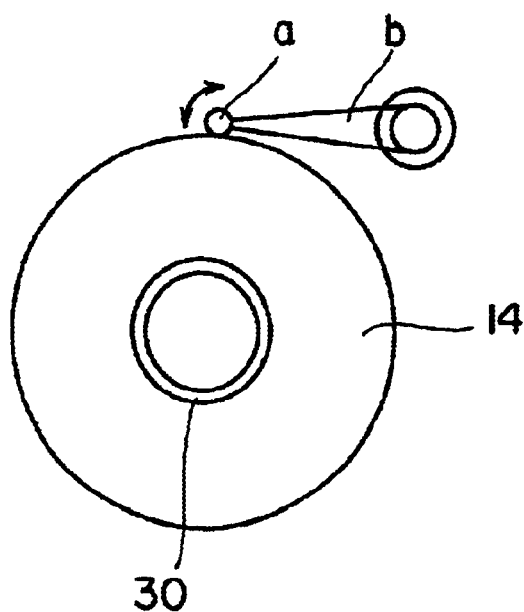
FIG. 7 is an explanation view which explains a conventional peripheral surface shape measuring apparatus.
Figure 8:
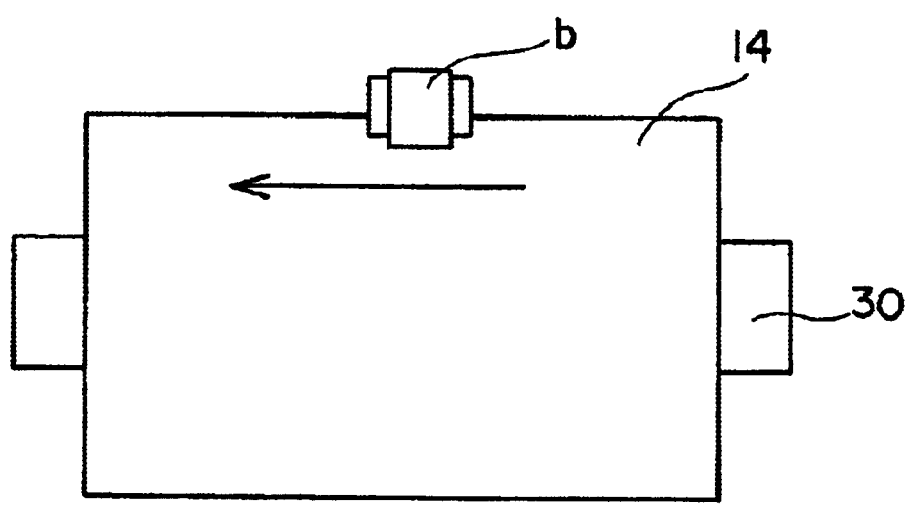
FIG. 8 is an explanation view which explains the conventional peripheral surface shape measuring apparatus.

Furthermore, as the peripheral surface shape measuring apparatus of the comparative example, the peripheral surface shape measuring apparatus of the conventional system shown in FIG. 7 was used. This apparatus is an apparatus in which a contact type shape sensor b whose sensor part a rotates according to the peripheral surface shape of a roll-like object 14 is provided to the main body of the apparatus (not shown in the drawing), and as shown in FIG. 8, while moving it from one end side of the roll-like object 14 toward the other end side, the displacement amount at the time when the sensor part a rotates is measured with respect to the main body of the apparatus by using the shape sensor b.

As the roll-like object that was the object to be measured, a magnetic tape bulk roll was used, which had an outside diameter of about 400 mm by winding the web made of polyethylene terephthalate (PET) with a thickness of 10 $\mu$m and a width of 1200 mm on a winding core made of aluminum with a diameter of $\phi$170 mm and a face length (length in the axial direction) of 1500 mm. This magnetic tape bulk roll has a curved peripheral surface shape shown in FIG. 6, and the diameter is the same at both end parts.

The measurement was performed by repeating the operation five times, in which the sensor part of the peripheral surface shape measuring apparatus of the example or the comparative example was moved from one end side to the other end side in the axial direction of the magnetic tape bulk roll, and the peripheral surface shape was measured. Furthermore, at the time of repeated measurement, the peripheral surface shape measuring apparatus was once removed from the magnetic tape bulk roll, and after that, it was mounted again and the measurement is performed.

The evaluations of the measuring accuracy of the example of the present invention and the comparative example were compared by performing the following three tests.

Test 1

By the repeated measurements of five times, the dispersion (difference between the maximum value and the minimum value) of the values found by subtracting the displacement amount of the measurement end point (position on the other end side of the magnetic tape bulk roll) from the displacement amount of the measurement start point (position on one end side of the magnetic tape bulk roll) was evaluated, and the result thereof was shown in Table 1. Originally, the difference between the displacement amount of the measurement start point and the displacement amount of the measurement end point should be zero since the diameters at both end parts of the magnetic tape bulk roll are the same, but it is difficult for the sensor part to move completely in parallel to the central axis of the roll-like object, and therefore, it is an object of Test 1 to examine the degree of effect given to the measuring accuracy in that case. The larger difference in Table 1 expresses the larger effect.

TABLE 1

| | Measurement start point displacement amount − measurement end point displacement amount (mm) | | | | | Difference (mm) |
|---|---|---|---|---|---|---|
| Example | 0.21 | 0.23 | 0.22 | 0.23 | 0.24 | 0.03 |
| Comparative example | 0.33 | 0.41 | 0.11 | 0.21 | 0.40 | 0.30 |

As apparent from the result in Table 1, while the difference of the measurement start point displacement amount—the measurement end point displacement amount of the example was a small value of 0.03 mm, it was 0.30 mm in the case of the comparative example, which was a dispersion of ten times the value of the example.

Test 2

By the repeated measurements of five times, the dispersion (difference between the maximum value and the minimum value) of the displacement amount at the maximum convex part of the magnetic tape bulk roll was evaluated, and the result thereof was shown in Table 2. It is an object of Test 2 to examine the repeat accuracy of the measurement, and the smaller difference in Table 2 expresses the better repeat accuracy.

TABLE 2

| | Displacement amount of maximum convex part (mm) | | | | | Difference (mm) |
|---|---|---|---|---|---|---|
| Example | 0.81 | 0.80 | 0.81 | 0.79 | 0.81 | 0.02 |
| Comparative example | 0.85 | 0.74 | 0.72 | 0.88 | 0.83 | 0.16 |

As apparent from the result in Table 2, while the dispersion of the displacement amount at the maximum convex part of the example was 0.02 mm, the dispersion of the displacement amount at the maximum convex part of the comparative example was 0.16 mm, which was a dispersion of eight times the value of the example.

Test 3

By the repeated measurements of five times, the dispersion (difference between the maximum value and the minimum value) of the average values of the diameter calculated on the basis of the displacement amounts at the positions of eleven points in the axial direction of the magnetic tape bulk roll was evaluated, and the result thereof was shown in Table 3. It is an object of Test 3 to examine the measuring accuracy obtained as the peripheral surface shape of the magnetic tape bulk roll, and the smaller difference in Table 3 expresses the better measuring accuracy.

As apparent from the result of Table 3, while the dispersion of the average values of the diameter at eleven point positions was 0.03 mm in the case of the example, it became 0.21 mm in the case of the comparative example, which was about seven times the value of the example.

As the reason why the dispersion of the example of the present invention was smaller than that of the comparative example, it is considered that the following point considerably contributed: in the case of the peripheral surface shape measuring apparatus of the present invention, the magnetic tape bulk roll is pinched with the sensor part and the reference point part in the diameter direction of the magnetic tape bulk roll, and the measurement is performed relatively with respect to the reference point part brought into contact with the magnetic tape bulk roll itself that is the object to be measured, and therefore, even in the case where the moving direction of the sensor part is not completely in parallel to the central axis of the roll-like object, the effect given onto the measuring accuracy can be reduced.

Furthermore, in the case of the example, the bar-like sensor part and reference point part shown in FIG. 3, and the guiding device were not used, but by using these, it can be expected that the dispersion is furthermore reduced.

According to the peripheral surface shape measuring apparatus of a roll-like object of the present invention, the peripheral surface shape of a roll-like object can simply and accurately be measured.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A peripheral surface shape measuring apparatus of a roll-like object which measures a peripheral surface shape of a roll-like object, comprising:
   a displacement amount measuring device which has a pinching device including two arms connected together

TABLE 3

| | Average value of diameters at eleven point positions (mm) | | | | | Difference (mm) |
|---|---|---|---|---|---|---|
| Example | 395.75 | 395.73 | 395.75 | 395.72 | 395.74 | 0.03 |
| Comparative example | 395.77 | 395.82 | 395.68 | 395.89 | 395.80 | 0.21 | at first end portions with a hinge and that pinch the roll-like object in a diameter direction of the roll-like object with a sensor part and a reference point part arranged opposite to each other in second end portions of the two arms, and which measures a displacement amount when the sensor part is relatively displaced in the diameter direction with respect to the reference point part;

a moving device which moves the displacement amount measuring device from one end side of the roll-like object to another end side of the roll-like object in an axial direction of the roll-like object;

a casing which supports the displacement amount measuring device and the moving device; and a pair of jacking devices which are arranged on the casing, each of the pair of jacking devices having a forked supporting part to be engaged on one of sides of a core of the roll-like object, wherein when the peripheral surface shape of the roll-like object is measured, the casing is detachably mounted on the roll-like object, and the pair of jacking devices adjust so that inclination of the casing with respect to the core of the roll-like object is eliminated so as to enable the displacement amount measuring device to move in parallel to a central axis of the roll-like object, and wherein the peripheral surface shape of the roll-like object is measured on the basis of the displacement amount of the sensor part accompanied by movement of the displacement amount measuring device.

2. The peripheral surface shape measuring apparatus of the roll-like object according to claim 1, wherein the sensor part and the reference point part are shaped like bars which are perpendicular to the axial direction of the roll-like object and are in parallel to each other.

3. The peripheral surface shape measuring apparatus of the roll-like object according to claim 1, wherein contact positions to the roll peripheral surface of the sensor part and the reference point part which pinch the roll-like object are within a range of ±5 mm with respect to the diameter direction in a plane perpendicular to the diameter direction.

4. The peripheral surface shape measuring apparatus of the roll-like object according to claim 3, wherein the sensor part and the reference point part are shaped like bars which are perpendicular to the axial direction of the roll-like object and are in parallel to each other.

* * * * *